(12) United States Patent
Flockhart et al.

(10) Patent No.: US 8,094,804 B2
(45) Date of Patent: Jan. 10, 2012

(54) METHOD AND APPARATUS FOR ASSESSING THE STATUS OF WORK WAITING FOR SERVICE

(75) Inventors: Andrew D. Flockhart, Thornton, CO (US); Larry J. Roybal, Westminster, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 2295 days.

(21) Appl. No.: 10/673,103

(22) Filed: Sep. 26, 2003

(65) Prior Publication Data
US 2005/0071211 A1    Mar. 31, 2005

(51) Int. Cl.
*H04M 3/00* (2006.01)
(52) U.S. Cl. .................... 379/266.03; 379/309
(58) Field of Classification Search ............ 379/265.01–265.14, 266.01–266.1, 309; 700/100, 102
See application file for complete search history.

(56) References Cited

U.S. PATENT DOCUMENTS

| | | |
|---|---|---|
| 4,163,124 A | 7/1979 | Jolissaint |
| 4,389,400 A | 6/1983 | Ho |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. ............... 379/309 |
| 5,210,789 A | 5/1993 | Jeffus et al. |
| 5,274,700 A | 12/1993 | Gechter et al. |

(Continued)

FOREIGN PATENT DOCUMENTS
CA     2143198     1/1995
(Continued)

OTHER PUBLICATIONS

U.S. Appl. No. 10/673,118, filed Sep. 26, 2003, Flockhart et al.

(Continued)

*Primary Examiner* — William J Deane
(74) *Attorney, Agent, or Firm* — Sheridan Ross P.C.

(57) ABSTRACT

The present invention provides a system and method for assessing the status of work waiting for service in a work queue or a work pool. Work items are placed in the work queue or work pool and have a service time goal. The work items in the work queue or work pool are scanned and a required queue position for each work item is calculated according to the amount of time remaining prior to the expiration of the service time goal and weighted advance time for servicing of work items in the work queue or pool. An array of counters has elements which correspond to required queue positions. Upon the calculation of the required queue position for a work item, the counter corresponding to the required queue position is incremented. When all of the work items are scanned, the array of counters is analyzed to predict a future state of the work queue or work pool.

43 Claims, 5 Drawing Sheets

U.S. PATENT DOCUMENTS

| | | | |
|---|---|---|---|
| 5,278,898 A | 1/1994 | Cambray et al. | |
| 5,289,368 A | 2/1994 | Jordan et al. | |
| 5,291,550 A | 3/1994 | Levy et al. | |
| 5,299,260 A | 3/1994 | Shaio | |
| 5,309,513 A | 5/1994 | Rose | |
| 5,325,292 A | 6/1994 | Crockett | |
| 5,335,268 A | 8/1994 | Kelly, Jr. et al. | |
| 5,335,269 A | 8/1994 | Steinlicht | |
| 5,355,269 A | 10/1994 | Clausen | |
| 5,390,243 A | 2/1995 | Casselman et al. | |
| 5,436,965 A | 7/1995 | Grossman et al. | |
| 5,444,774 A | 8/1995 | Friedes | |
| 5,467,391 A | 11/1995 | Donaghue et al. | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,499,291 A | 3/1996 | Kepley | |
| 5,500,795 A | 3/1996 | Powers et al. | |
| 5,504,894 A | 4/1996 | Ferguson et al. | |
| 5,506,898 A | 4/1996 | Costantini et al. | 379/266 |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,555,299 A | 9/1996 | Maloney et al. | |
| 5,577,169 A | 11/1996 | Prezioso | |
| 5,590,188 A | 12/1996 | Crockett | |
| 5,592,378 A | 1/1997 | Cameron et al. | |
| 5,592,542 A | 1/1997 | Honda et al. | |
| 5,594,726 A | 1/1997 | Thompson et al. | |
| 5,603,029 A | 2/1997 | Aman et al. | |
| 5,604,892 A | 2/1997 | Nuttall et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | 379/266 |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,721,770 A | 2/1998 | Kohler | |
| 5,724,092 A | 3/1998 | Davidsohn et al. | |
| 5,740,238 A | 4/1998 | Flockhart et al. | 379/221 |
| 5,742,675 A | 4/1998 | Kilander et al. | |
| 5,742,763 A | 4/1998 | Jones | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | 379/221 |
| 5,754,776 A | 5/1998 | Hales et al. | |
| 5,754,841 A | 5/1998 | Carino, Jr. | |
| 5,757,904 A | 5/1998 | Anderson | |
| 5,784,452 A | 7/1998 | Carney | |
| 5,790,642 A | 8/1998 | Taylor et al. | |
| 5,790,650 A | 8/1998 | Dunn et al. | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,802,510 A | 9/1998 | Jones | |
| 5,818,907 A | 10/1998 | Maloney et al. | |
| 5,819,084 A | 10/1998 | Shapiro et al. | |
| 5,825,869 A | 10/1998 | Brooks et al. | |
| 5,826,039 A | 10/1998 | Jones | |
| 5,828,747 A | 10/1998 | Fisher et al. | 379/309 |
| 5,836,011 A | 11/1998 | Hambrick et al. | |
| 5,838,968 A | 11/1998 | Culbert | |
| 5,839,117 A | 11/1998 | Cameron et al. | |
| 5,864,874 A | 1/1999 | Shapiro | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,901,214 A | 5/1999 | Shaffer et al. | |
| 5,903,641 A | 5/1999 | Tonisson | |
| 5,903,877 A | 5/1999 | Berkowitz et al. | 705/26 |
| 5,905,793 A | 5/1999 | Flockhart et al. | 379/266 |
| 5,909,669 A | 6/1999 | Havens | |
| 5,911,134 A | 6/1999 | Castonguay et al. | |
| 5,914,951 A | 6/1999 | Bentley et al. | |
| 5,915,012 A | 6/1999 | Miloslavsky | |
| 5,923,745 A | 7/1999 | Hurd | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandit | |
| 5,940,496 A | 8/1999 | Gisby et al. | |
| 5,941,983 A | 8/1999 | Gupta et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | 379/266 |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,014,437 A | 1/2000 | Acker et al. | |
| 6,031,896 A | 2/2000 | Gardell et al. | |
| 6,038,293 A | 3/2000 | McNerney et al. | |
| 6,038,296 A | 3/2000 | Brunson et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | 370/412 |
| 6,049,779 A | 4/2000 | Berkson | |
| 6,052,723 A | 4/2000 | Ginn | |
| 6,055,308 A | 4/2000 | Miloslavsky et al. | |
| 6,058,179 A | 5/2000 | Shaffer et al. | |
| 6,064,730 A | 5/2000 | Ginsberg | |
| 6,064,731 A | 5/2000 | Flockhart et al. | 379/265 |
| 6,084,954 A | 7/2000 | Harless et al. | |
| 6,088,441 A | 7/2000 | Flockhart et al. | 379/265 |
| 6,097,885 A | 8/2000 | Rayner | |
| 6,108,670 A | 8/2000 | Weida et al. | |
| 6,115,462 A | 9/2000 | Servi et al. | |
| 6,128,304 A | 10/2000 | Gardell et al. | |
| 6,151,571 A | 11/2000 | Pertrushin | |
| 6,154,769 A | 11/2000 | Cherkasova et al. | |
| 6,163,607 A | 12/2000 | Bogart et al. | 379/266 |
| 6,173,053 B1 | 1/2001 | Bogart et al. | 379/266 |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,185,603 B1 | 2/2001 | Henderson et al. | |
| 6,192,122 B1 | 2/2001 | Flockhart et al. | 379/266 |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick et al. | |
| 6,259,969 B1 | 7/2001 | Tackett et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley et al. | |
| 6,292,550 B1 | 9/2001 | Burritt | |
| 6,295,353 B1 | 9/2001 | Flockhart et al. | 379/265 |
| 6,298,062 B1 | 10/2001 | Gardell et al. | |
| 6,307,931 B1 | 10/2001 | Vaudreuil | |
| 6,324,282 B1 | 11/2001 | McIllwaine et al. | |
| 6,332,081 B1 | 12/2001 | Do | |

| | | |
|---|---|---|
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,363,411 B1 | 3/2002 | Dugan et al. |
| 6,366,666 B2 | 4/2002 | Bengtson et al. |
| 6,366,668 B1 | 4/2002 | Borst et al. ............... 379/266.04 |
| 6,373,836 B1 | 4/2002 | Deryugin et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. ...... 379/265.05 |
| 6,463,148 B1 | 10/2002 | Brady |
| 6,463,346 B1 | 10/2002 | Flockhart et al. ............. 700/102 |
| 6,463,415 B2 | 10/2002 | St. John |
| 6,463,471 B1 | 10/2002 | Dreke et al. |
| 6,480,826 B2 | 11/2002 | Pertrushin |
| 6,487,290 B1 | 11/2002 | Le Grand |
| 6,490,350 B2 | 12/2002 | McDuff et al. |
| 6,519,570 B1 | 2/2003 | Faber et al. |
| 6,535,600 B1 | 3/2003 | Fisher et al. ............. 379/265.12 |
| 6,535,601 B1 | 3/2003 | Flockhart et al. ........ 379/266.01 |
| 6,546,087 B2 | 4/2003 | Shaffer et al. |
| 6,553,114 B1 | 4/2003 | Fisher et al. |
| 6,556,974 B1 | 4/2003 | D'Alessandro |
| 6,560,329 B1 | 5/2003 | Draginich et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. .......... 379/265.1 |
| 6,571,285 B1 | 5/2003 | Groath et al. |
| 6,574,599 B1 | 6/2003 | Lim et al. |
| 6,574,605 B1 | 6/2003 | Sanders et al. |
| 6,584,191 B1 | 6/2003 | McPartlan et al. |
| 6,587,831 B1 | 7/2003 | O'Brien |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. ........ 379/265.12 |
| 6,636,598 B1 | 10/2003 | Thomson et al. |
| 6,639,982 B1 | 10/2003 | Stuart et al. |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,687,257 B1 | 2/2004 | Balasubramanian |
| 6,700,967 B2 | 3/2004 | Kleinoder et al. |
| 6,704,409 B1 | 3/2004 | Dilip et al. |
| 6,707,903 B2 * | 3/2004 | Burok et al. ............. 379/265.02 |
| 6,711,253 B1 | 3/2004 | Prabhaker |
| 6,711,255 B2 | 3/2004 | Berrondo et al. |
| 6,714,643 B1 * | 3/2004 | Gargeya et al. .......... 379/266.06 |
| 6,718,330 B1 | 4/2004 | Zenner |
| 6,724,884 B2 | 4/2004 | Jensen et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,748,414 B1 | 6/2004 | Bournas |
| 6,754,333 B1 | 6/2004 | Flockhart et al. |
| 6,757,362 B1 | 6/2004 | Cooper et al. |
| 6,766,326 B1 | 7/2004 | Cena |
| 6,772,202 B2 | 8/2004 | Wright |
| 6,775,377 B2 | 8/2004 | McIllwaine et al. |
| 6,785,666 B1 | 8/2004 | Nareddy et al. |
| 6,801,520 B2 | 10/2004 | Philonenko |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,850,613 B2 | 2/2005 | McPartlan et al. |
| 6,859,529 B2 * | 2/2005 | Duncan et al. ............. 379/266.1 |
| 6,898,190 B2 | 5/2005 | Shtivelman et al. |
| 6,915,305 B2 | 7/2005 | Subramanian et al. |
| 6,937,993 B1 | 8/2005 | Gabbita et al. |
| 6,947,988 B1 | 9/2005 | Saleh |
| 6,968,052 B2 | 11/2005 | Wullert, II |
| 6,968,509 B1 | 11/2005 | Chang et al. |
| 6,970,554 B1 | 11/2005 | Peterson et al. |
| 6,970,829 B1 | 11/2005 | Leamon |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,013,344 B2 | 3/2006 | Megiddo |
| 7,020,254 B2 | 3/2006 | Phillips |
| 7,023,979 B1 | 4/2006 | Wu et al. |
| 7,035,808 B1 | 4/2006 | Ford |
| 7,039,176 B2 | 5/2006 | Borodow et al. |
| 7,043,007 B2 | 5/2006 | McPartlan et al. |
| 7,047,192 B2 | 5/2006 | Poirier |
| 7,050,566 B2 | 5/2006 | Becerra et al. |
| 7,062,031 B2 | 6/2006 | Becerra et al. |
| 7,068,775 B1 | 6/2006 | Lee |
| 7,072,966 B1 * | 7/2006 | Benjamin et al. ............. 709/228 |
| 7,076,051 B2 | 7/2006 | Brown et al. |
| 7,085,367 B1 | 8/2006 | Lang |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,133,520 B1 | 11/2006 | Doyle et al. |
| 7,136,873 B2 | 11/2006 | Smith et al. |
| 7,142,666 B1 | 11/2006 | Bates et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et |
| 7,215,744 B2 | 5/2007 | Scherer |
| 7,246,371 B2 | 7/2007 | Diacakis et al. |
| 7,254,641 B2 | 8/2007 | Broughton et al. |
| 7,257,597 B1 | 8/2007 | Pryce et al. |
| 7,266,508 B1 | 9/2007 | Owen et al. |
| 7,269,253 B1 | 9/2007 | Wu et al. |
| 7,272,223 B2 * | 9/2007 | McCormack et al. ... 379/265.09 |
| 7,283,805 B2 | 10/2007 | Agrawal |
| 7,295,669 B1 | 11/2007 | Denton et al. |
| 7,299,259 B2 | 11/2007 | Petrovykh |
| 7,346,532 B2 * | 3/2008 | Kusama et al. .................... 705/8 |
| 7,372,857 B1 | 5/2008 | Kappler et al. |
| 7,372,952 B1 | 5/2008 | Wu et al. |
| 7,373,309 B2 * | 5/2008 | Nishikawa et al. ................ 705/7 |
| 7,376,127 B2 | 5/2008 | Hepworth et al. |
| 7,382,773 B2 | 6/2008 | Schoeneberger et al. |
| 7,392,402 B2 | 6/2008 | Suzuki |
| 7,406,098 B2 | 7/2008 | Taneja et al. |
| 7,409,423 B2 | 8/2008 | Horvitz et al. |
| 7,418,093 B2 | 8/2008 | Knott et al. |
| 7,418,094 B2 * | 8/2008 | Golitsin et al. .......... 379/265.12 |
| 7,478,051 B2 | 1/2009 | Nourbakhsh et al. |
| 7,526,440 B2 | 4/2009 | Walker et al. |
| 7,545,925 B2 | 6/2009 | Williams |
| 7,551,602 B2 | 6/2009 | Whitman, Jr. |
| 7,567,653 B1 | 7/2009 | Michaelis |
| 7,734,032 B1 | 6/2010 | Kiefhaber et al. |
| 2001/0011228 A1 | 8/2001 | Shenkman |
| 2001/0040887 A1 | 11/2001 | Shtivelman et al. |
| 2001/0056349 A1 | 12/2001 | St. John |
| 2002/0002460 A1 | 1/2002 | Pertrushin |
| 2002/0002464 A1 | 1/2002 | Pertrushin |

| Publication No. | Date | Inventor |
|---|---|---|
| 2002/0010587 A1 | 1/2002 | Pertrushin |
| 2002/0012186 A1 | 1/2002 | Nakamura et al. |
| 2002/0019829 A1 | 2/2002 | Shapiro |
| 2002/0021307 A1 | 2/2002 | Glenn et al. |
| 2002/0029213 A1 | 3/2002 | Borissov et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0118816 A1 | 8/2002 | Flockhart et al. ........ 379/265.12 |
| 2002/0131399 A1* | 9/2002 | Philonenko ................... 370/351 |
| 2002/0181692 A1 | 12/2002 | Flockhart et al. ........ 379/265.02 |
| 2002/0194002 A1 | 12/2002 | Petrushin |
| 2003/0016812 A1 | 1/2003 | Rodenbusch et al. |
| 2003/0026414 A1 | 2/2003 | Baker et al. |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0095652 A1 | 5/2003 | Mengshoel et al. |
| 2003/0108186 A1 | 6/2003 | Brown et al. |
| 2003/0123642 A1 | 7/2003 | Alvarado et al. ........ 379/266.01 |
| 2003/0144900 A1 | 7/2003 | Whitmer |
| 2003/0144959 A1 | 7/2003 | Makita |
| 2003/0152212 A1 | 8/2003 | Burok et al. ............ 379/265.02 |
| 2003/0154184 A1 | 8/2003 | Chee et al. |
| 2003/0169870 A1 | 9/2003 | Stanford |
| 2003/0177231 A1 | 9/2003 | Flockhart et al. ............. 709/225 |
| 2003/0182310 A1 | 9/2003 | Charnock et al. |
| 2003/0231647 A1 | 12/2003 | Petrovykh |
| 2003/0231757 A1 | 12/2003 | Harkreader et al. |
| 2004/0008828 A1 | 1/2004 | Coles et al. |
| 2004/0010437 A1 | 1/2004 | Kiran et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0202309 A1 | 10/2004 | Baggenstoss et al. |
| 2004/0210475 A1 | 10/2004 | Starnes et al. |
| 2004/0230675 A1* | 11/2004 | Freimuth et al. .............. 709/223 |
| 2004/0260706 A1 | 12/2004 | Anonsen et al. |
| 2005/0004828 A1 | 1/2005 | deSilva et al. |
| 2005/0013428 A1 | 1/2005 | Walters |
| 2005/0021529 A1 | 1/2005 | Hodson et al. |
| 2005/0041580 A1 | 2/2005 | Petrovykh |
| 2005/0044375 A1* | 2/2005 | Paatero et al. |
| 2005/0065837 A1 | 3/2005 | Kosiba et al. |
| 2005/0071211 A1 | 3/2005 | Flockhart et al. |
| 2005/0091071 A1* | 4/2005 | Lee |
| 2005/0125276 A1 | 6/2005 | Rusu |
| 2005/0125432 A1* | 6/2005 | Lin et al. |
| 2005/0125458 A1* | 6/2005 | Sutherland et al. |
| 2005/0129212 A1 | 6/2005 | Parker |
| 2005/0135593 A1 | 6/2005 | Becerra et al. |
| 2005/0135600 A1 | 6/2005 | Whitman |
| 2005/0135601 A1 | 6/2005 | Whitman |
| 2005/0138064 A1* | 6/2005 | Trappen et al. |
| 2005/0154708 A1* | 7/2005 | Sun |
| 2005/0182784 A1* | 8/2005 | Trappen et al. |
| 2005/0289446 A1* | 12/2005 | Moncsko et al. |
| 2006/0004686 A1* | 1/2006 | Molnar et al. |
| 2006/0007916 A1* | 1/2006 | Jones et al. |
| 2006/0015388 A1 | 1/2006 | Flockhart et al. |
| 2006/0045255 A1 | 3/2006 | Peters et al. |
| 2006/0056598 A1* | 3/2006 | Brandt et al. |
| 2006/0135058 A1* | 6/2006 | Karabinis |
| 2006/0178994 A1* | 8/2006 | Stolfo et al. |
| 2006/0242160 A1* | 10/2006 | Kanchwalla et al. |
| 2006/0256957 A1* | 11/2006 | Fain et al. |
| 2006/0271418 A1* | 11/2006 | Hackbarth, et al. |
| 2007/0038632 A1* | 2/2007 | Engstrom |
| 2007/0064912 A1* | 3/2007 | Kagan et al. |
| 2007/0083572 A1* | 4/2007 | Bland et al. |
| 2007/0112953 A1* | 5/2007 | Barnett |
| 2007/0127643 A1* | 6/2007 | Keagy |
| 2007/0192414 A1 | 8/2007 | Chen et al. |
| 2007/0201311 A1* | 8/2007 | Olson |
| 2007/0201674 A1* | 8/2007 | Annadata et al. |
| 2007/0230681 A1* | 10/2007 | Boyer et al. |
| 2008/0056165 A1* | 3/2008 | Petrovykh |
| 2008/0275751 A1 | 11/2008 | Flockhart et al. |
| 2008/0275752 A1 | 11/2008 | Flockhart et al. |
| 2008/0275766 A1 | 11/2008 | Flockhart et al. |
| 2009/0193050 A1* | 7/2009 | Olson |

FOREIGN PATENT DOCUMENTS

| | | |
|---|---|---|
| CA | 2174762 | 3/1996 |
| EP | 0 501 189 A2 | 9/1992 |
| EP | 0 740 450 A2 | 10/1996 |
| EP | 0 772 335 A2 | 5/1997 |
| EP | 0770967 | 5/1997 |
| EP | 0 829 996 A2 | 3/1998 |
| EP | 0 855 826 A2 | 9/1998 |
| EP | 0 863 651 A2 | 9/1998 |
| EP | 0 866 407 A1 | 9/1998 |
| EP | 0 899 673 A2 | 3/1999 |
| EP | 0 998 108 A1 | 5/2000 |
| EP | 1035718 | 9/2000 |
| EP | 1075130 | 2/2001 |
| EP | 1 091 307 A2 | 4/2001 |
| EP | 1 150 236 A2 | 10/2001 |
| EP | 1 246 097 * | 10/2002 |
| EP | 1246097 | 10/2002 |
| GB | 2 273 418 | 6/1994 |
| GB | 2 290 192 A | 12/1995 |
| JP | 06-019861 | 1/1994 |
| JP | H7-005907 | 1/1995 |
| JP | 2001-053843 | 2/2001 |
| JP | 2001-077922 | 3/2001 |
| JP | 2002-297900 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 01/80540 A1 | 10/2001 |
| WO | WO 02/099640 | 12/2002 |

OTHER PUBLICATIONS

U.S. Appl. No. 10/673,115, filed Sep. 26, 2003, Flockhart et al.
U.S. Appl. No. 10/673,105, filed Sep. 26, 2003, Flockhart et al.
U.S. Appl. No. 12/022,850, filed Jan. 30, 2008, Flockhart et al.
Summons to attend oral proceedings for European Application No. 04255262.0, mailed Jul. 17, 2007.
Minutes of the oral proceedings before the Examining Division for European Application No. 04255262.0, mailed Dec. 28, 2007.
Decision to refuse a European Patent Application for Euorpean App. No. 04255262.0 dated Jan. 11, 2008.
Canadian Examiner's Report for Canadian Patent Application No. 2,469,399 dated Mar. 1, 2007.
Avaya, Inc., Business Advocate Product Summary, available at http://www.avaya.com, downloaded on Feb. 15, 2003, Avaya, Inc. 2003.
Avaya, Inc., Business Advocate Options, available at http://www.avaya.com, downloaded on Feb. 15, 2003, Avaya, Inc., 2003.
Avaya, Inc., CentreVu Advocate, Release 9, User Guide, Dec. 2000.
"Internet Protocol Addressing," available at http://samspade.org/d/ipdns.html, downloaded Mar. 31, 2003.
"Domain Name Services," available at http://www.pism.com/chapt09/chapt09.html, downloaded Mar. 31, 2003.
Bellsouth Corp., "Frequently Asked Questions—What is a registrar?," available at https://registration.bellsouth.net/NASApp/DNSWebUI/FAQ.jsp, downloaded Mar. 31, 2003.
Stevenson, Douglas, et al., "Name Resolution in Network and Systems Management Environments," available at http://netman.cit.buffalo.edu/Doc/DStevenson/NR-NMSE.html, downloaded Mar. 31, 2003.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001.
Coles, Scott, "A Guide for Ensuring Service Quality in IP Voice Networks," Avaya, Inc., 2002.
Avaya, Inc., "The Advantages of Load Balancing in the Multi-Call Center Enterprise," Avaya, Inc., 2002.
Foster, Robin, et al., "Avaya Business Advocate and its Relationship to Multi-Site Load Balancing Applications," Avaya, Inc., Mar. 2002.
Chavez, David, et al., "Avaya MultiVantage Software: Adapting Proven Call Processing for the Transition to Converged IP Networks," Avaya, Inc., Aug. 2002.
Avaya, Inc., "Voice Over IP Via Virtual Private Networks: An Overview," Avaya, Inc., Feb. 2001.
Avaya, Inc., "Better Implementation of IP in Large Networks," Avaya, Inc. 2002.
Examiner's Office Letter (including translation) for Japanese Patent Application No. 2004-276377, mailed Feb. 2, 2009.
Spraetz, Out with the new, in with the old: A look at scheduling alternatives, Customer Inter@ction Solutions; Nov. 2001: 20,5.
www.EIX.com (1998-2002) (http://web.archive.org/web/20020803000353/http://www.iex.com): Totalview The Workforce Management Solution, TotalView Product Literature: The Perfect Fit.
www.EIX.com (1998-2002) (http://web.archive.org/web/20020803000353/http://vvvvw.iex.com): Totalview The Workforce Management Solution, TotalView Product Literature: TotalView's Agent Webstation.
Business Editors, Microdyne Outsourcing Rolls Out RightForce Workforce Management to Manage Bi-Coastal Contact Center and E-Services Staff Business Wire. New York: Dec. 4, 2001. p. 1.
Business Editors, High Tech Editors. IEX Enhances Award-Winning Workforce Management Solution Business Wire. New York: Jul. 31, 2001. p. 1.
Official Action for Canadian Patent Application No. 2469399, mailed Mar. 12, 2009.
Eder, Johann et al. "Time Management in Workflow Systems." BIS'99 3rd International Conference on Business Information Systems (1999).
Evenson et al., Effective Call Center Management: Evidence from Financial Services, The Wharton Financial Institutions Center, Jan. 1999.
Judge et al., Agent-enhanced workflow, BT Technologies Journal, vol. 16 No. 3, 1998.
Morris et al., Sardine: Dynamic Seller Strategies in an Auction Marketplace, EC'OO, ACM, Oct. 17-20, 2000, p. 128-134.
Notice of Allowance for Canadian Patent Application No. 2,469,399 dated Aug. 12, 2009.
Microsoft Corporation. "User's Guide: Microsoft Project: Business Project Planning System Version 4.1 for Windows 95 or Version 4.0 for Windows 3.1." 1995. pp. 1-40 (Chapters 1-4).
Dinda, Peter A., "A Prediction-based Real-time Scheduling Advisor", 2002, pp. 1-8.
Official Action for U.S. Appl. No. 12/142,599, mailed Mar. 31, 2010.
U.S. Appl. No. 10/946,638, Flockhart et al.
U.S. Appl. No. 11/069,739, Flockhart et al.
U.S. Appl. No. 11/064,367, Flockhart et al.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-Athena, Section 5—Company C520, p. 95, 1992.
Dawson, "NPRI's Powerguide, Software Overview" Call Center Magazine (Jun. 1993), p. 85.
"Applications, NPRI's Predictive Dialing Package," Computer Technology (Fall 1993), p. 86.
"Call Center Software You Can't Outgrow," Telemarketing® (Jul. 1993), p. 105.
"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CallRouter" Optimizing the Interaction Between Customers and Answering Resources. 6 pages, 1998.
Examiner's Refusal Decision dated Jul. 4th, 2005 in Japanese Patent App. No. 2000-34266.
Examiner's Refusal Decision for Japanese Patent Application No. 2000-34267 dated Mar. 9, 2005 with translation, 4 pages.
Avaya, Inc., "Better Implementation of IP in Large Networks," Avaya, Inc. 2002, 14 pages.
"eGain's Commerce 2000 Platform Sets New Standard for eCommerce Customer Communications," Business Wire (Nov. 15, 1999).
"When Talk Isn't Cheap," Sm@rt Reseller, v. 3, n. 13 (Apr. 3, 2000), p. 50.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps.gz, 8 pages.
John H.L. Hansen et al., "Foreign Accent Classification Using Source Generator Based Prosodic Features," Robust Speech Processing Laboratory, Duke University Department of Electrical Engineering, (undated), pp. 1-4, May 1995, vol. 1, pp. 836-839.
L.F. Lamel and J.L. Gauvain, "Language Identification Using Phone-Based Acoustic Likelihoods," ICASSP-94, 4 pages. Apr. 1994.
Levent M. Arslan at al., "Language Accent Classification in American English," Robust Speech Processing Laboratory, Duke University Department of Electrical Engineering, Technical Report RSPL-96-7, revised Jan. 29, 1996, pp. 1-16.
Levent M. Arslan, "Foreign Accent Classification in American English," Dissertation submitted to Department of Electrical Computer Engineering, Graduate School of Duke University, (1996), pp. 1-201.
MIT Project Oxygen, "Pervasive, Human-Centered Computing—Oxygen," MIT Laboratory for Computer Science, (Jun. 2000), pp. 1-15.
Presentation by Victor Zue, "The MIT Oxygen Project," MIT Laboratory for Computer Science, Cambridge, MA (Apr. 25-26, 2000), 9 pages.
European Search Report for European Appl. No. 04255262.0 dated Dec. 23, 2004.
European Examination Report for European App. No. 04255262.0 dated Apr. 11, 2005.
Rabun, Andy and Jim Sommers. "Microsoft Project 98 Support Course", Microsoft Corporation. Jun. 1998, 879 pages.
"Microsoft Project 2000 Training Manual", Microsoft Corporation. 2000, 431 pages.
Canadian Examiner's Report for Canadian Patent Application No. 2,469,399 dated May 7, 2008.
Background of the Invention of the above-captioned application (previously provided) filed Sep 26 2009.
U.S. Appl. No. 11/199,828, filed Aug. 8, 2005, Bland et al.*
U.S. Appl. No. 11/242,687, filed Oct. 3, 2005, Krimstock et al.*
U.S. Appl. No. 11/245,724, filed Oct. 6, 2005, Flockhart et al.*
U.S. Appl. No. 11/517,646, filed Sep. 7, 2006, Hackbarth et al.*
U.S. Appl. No. 11/536,456, filed Sep. 28, 2006, Hackbarth et al.*
U.S. Appl. No. 11/861,857, filed Sep. 26, 2007, Tendick et al.
U.S. Appl. No. 12/242,916, filed Oct. 1, 2008, Kiefhaber et al.
"Avaya IQ—Building Upon the Strengths of CMS", White paper, Feb. 2007, 11 pages.
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"Driving Model Agent Behaviors With Avaya IQ", White Paper, Apr. 2007, 12 pages.
"KANA—Contact Center Support", available at http://www.kana.com/solutions.php?tid=46, copyright 2006, 3 pages.
"Monitoring: OneSight Call Statistics Monitors", available at http://www.empirix.com/default.asp?action=article&ID=301, date unknown, printed May 10, 2007, 2 pages.

"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).

"Still Leaving It to Fate?: Optimizing Workforce Management", Durr, William Jr., Nov. 2001.

Aspect—"Analysis and Reporting," http://aspect.com/products/analysis/index.cfm, (Copyright 2005) (1page).

Aspect —"Call Center Reports," http://aspect.com/products/analysis/ccreporting.cfm, (Copyright 2005) (2 pages).

Aspect —"Performance Optimization," http://aspect.com/products/wfm/performanceopt.cfm?section=performanceopt, (Copyright 2005) (1page).

Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Avaya Basic Call Management System Reporting Desktop" (Copyright 2002) (4 pages).

Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).

Avaya IQ "Introducing Reporting and Analytics As You Designed It", 2007, 4 pages.

Definity Communications System Generic 3 Call Vectoring/Expert Agent Selection (EAS) Guide, AT&T publication No. 555-230-520 (Issue 3, Nov. 1993).

Nortel—"Centrex Internet Enabled Call Centers," http://www.products.nortel.com/go/product_assoc.jsp?segld=0&parlD=0&catID=-9191&rend_id... (Copyright 1999-2005) (1page).

Official Action for U.S. Appl. No. 12/142,565, mailed Sep. 2, 2010.

Notice of Allowance for U.S. Appl. No. 12/142,599, mailed Oct. 12, 2010.

Examiner's Office Letter (including translation) for Japanese Patent Application No. 2004-276377, mailed Apr. 26, 2010.

* cited by examiner

| 250 { | 0 | 1 | 2 | 3 | 4 | 5 | 6 | 7 | 8 | 9 | 10 |
|---|---|---|---|---|---|---|---|---|---|---|---|
| 254 { | 1 | 2 | 3-4 | 5-8 | 9-16 | 17-32 | 33-64 | 65-128 | 129-256 | 257-512 | 513-1024 |

258 points to column 1 of row 250.

Fig. 5

METHOD AND APPARATUS FOR ASSESSING THE STATUS OF WORK WAITING FOR SERVICE

FIELD OF THE INVENTION

The present invention is directed to the scheduling of work items in a resource allocation system. In particular, the present invention is directed to service time goals for work items in a queue awaiting service, and assessing the status of work items in queue relative to their service time goals.

BACKGROUND OF THE INVENTION

In present day automatic contact distribution (ACD) systems, resource selection and allocation algorithms are commonly employed to perform calculations related to timing of operations and service time goals for work items in queue. These calculations are performed, for example, when a telephone call is received at a call center. When such a call is received, it is typically assigned to a pool of resources responsible for answering telephone calls. Furthermore, such calls generally have a service time goal, such as three minutes, which is the goal for an agent to answer the call. These service time goals are useful to help ensure a customer is not waiting to speak to an agent for a long period of time, which may reduce customer satisfaction.

In such ACD systems, contacts incoming to a contact center are answered and handled by a plurality of resources. The ACD system automatically distributes and connects incoming contacts to whatever resource, generally agents, have the skill set suited to handle the contacts and are free, i.e., not handling other contacts at the moment. As used herein, a "contact" refers to any mode or type of contact between two entities, including without limitation voice calls, VoIP, text-chat, e-mail, fax, electronic documents, web forms, voice messages, and video calls, to name but a few.

The contacts are placed in different queues based upon preestablished criteria, such as business/service policies, objectives, and goals for each contact type, and are typically placed in each queue in the order of their arrival and/or priority. Due to the random and peaked nature of inbound contacts from customers, a contact center may become overloaded when no suitable resources are available to handle contacts as the service time goal for the contacts expires. Furthermore, a contact center may have sufficient resources to handle present contacts which have service time goals currently expiring, but may not have enough resources to handle the contacts which have a service time goal at some point in the future.

As is known in the art, it is common for such ACD systems to include algorithms which detect whether service time goals are being met, and also to predict if service time goals are likely to be met in the future. Numerous techniques have been devised for determining an actual or anticipated wait time for each queued item, and the queued items are typically serviced based on the actual and/or anticipated wait time. However, such techniques generally look at only the head of the queue, in order to determine if the contact center is currently behind target, or is in a state of immediate risk. Techniques which are used to predict if service time goals are likely to be met in the future generally only look at the tail of the queue, or the last item in the queue, and make a determination of whether it is predicted that this item will be serviced at or before the service time goal for that work item, and give a yes/no answer as to whether there is a future risk. As will be understood, the last item in the queue may follow a number of items which all have a service time goal which will expire at substantially the same time. Thus, it is possible that the last item in a queue will show no future risk, while there in actuality is a future risk associated with the relatively heavy workload which precedes the last work item in the queue. Accordingly, it would be advantageous to have a method and apparatus which is able to determine future risk, and also determine when such risk will arise and the amount of resources required to correct the potential shortfall in resources.

Another problem with such techniques is that they were designed for real time servicing. As mentioned above, it is common to receive contacts in the form of e-mail, fax, electronic documents, web forms, voice messages, which do not require immediate attention of an agent, but rather are required to be attended to within a preset service time goal period. For example, the contact center may have a service time goal for electronic mail of one business day. Likewise, web forms which are received may have a goal of being answered within two business days. Such contacts are referred to as "back office contacts," which are placed into a queue which is to be serviced by a back office, meaning that they are not serviced by agents in real time with a contact.

In some ACD systems, such work items are placed in unordered work queues. These items often are received at different times, and have different service goals. Thus, if the items were to be placed in an ordered work pool, with the contacts ordered by the amount of time left to service the contact, each time a contact is added to the queue, the queue may have to be reordered. As will be understood, reordering a work queue can consume a significant amount of resources in a system, thus it may be advantageous to place such work items in an unordered work pool or work queue. One problem with placing contacts in an unordered work pool is that resource allocation algorithms are generally designed to operate using ordered work pools. Thus, it would be advantageous to have an unordered work pool with resource allocation algorithms which are able to assess the work in the unordered work pool to determine a status of the pool and make predictions regarding potential future resource shortfalls for the work pool.

SUMMARY OF THE INVENTION

These and other needs are addressed by the various embodiments and configurations of the present invention. The present invention is directed generally to a method and apparatus for assessing the status of work awaiting service in an ordered or unordered work pool. The methodology is particularly useful in contact centers.

In one embodiment, work items, such as contacts, product orders, service requests, are placed into a work queue for service by a resource. The status of work waiting for service is assessed by generating, based at least in part on the work queue, an ordered set of items related to the work items in the work queue, and analyzing the ordered set to predict a future state of the work queue. A required queue position (RQP) for each work item in said work queue, may be determined, the RQP based on a service time goal for each work item and an estimated time for completion of work items. The ordered set of items may be generated by creating an array of counters, each element in the array of counters corresponding to a predefined range of required queue positions. The array of counters may be modified by incrementing a counter in the array of counters associated with the RQP for each work item. The required queue position is determined, in one embodiment, for each work item, by subtracting an amount of time since the work item was received from the service time goal for the work item to obtain a remaining time for the work item. For each work item, determining a required queue position may include dividing the remaining time for the work item by the weighted advance time (WAT) of the work queue. The weighted advance time is the measure of the average time that is required for a work item to advance one position in the queue. The calculation of weighted advance time is described in U.S. Pat. No. 5,505,898, the disclosure of which is incorporated herein by reference in its entirety.

The ordered set of items, in one embodiment, is generated by determining a range of required queue positions which correspond to each item within the ordered set, and incrementing a counter associated with the item within the ordered set which corresponds to a required queue position associated with each work item. The range of queue positions for each item in the ordered set may be set to preestablished criteria, such as, for example, each item in the ordered set may correspond to one queue position, or each item in the ordered set, where the number of the item is N, may be $2^{N-1}<RQP\leqq 2^N$.

Analyzing the ordered set to predict a future state of the work queue, in one embodiment, includes the steps of creating an index variable, setting the index variable to one, creating a sum variable, setting the sum variable to zero, calculating a new sum as the sum of the previous value of the sum variable and the value of the item in the ordered set which corresponds to the index variable, determining if the sum is greater than the index, setting a state to "Future Risk" when the sum is greater than the index, and incrementing the index and repeating the calculating a new sum, determining if the sum is greater than the index, and setting a state when the sum is not greater than the index. In another embodiment, a range of queue positions corresponds to each item within the ordered set, and the determining step includes determining if the sum is greater than the highest number queue position which is associated with the item in the ordered set which corresponds to the index variable.

The analyzing of the ordered set may further include determining if there are additional items in the ordered set, and setting a state to "On Target" when there are no additional items in the ordered set. The analyzing of the ordered set may also include, when the sum is greater than the index, predicting a time of the "Future Risk". The time may be calculated as the product of the index and the estimated time for completion of work items. The analyzing of the ordered set may include, when the sum is greater than the index, determining an extent of the "Future Risk". The extent of the future risk is calculated, in one embodiment, as the difference between the sum and the index. The extent of the future risk is calculated, in another embodiment, as the difference between the sum and the highest number queue position associated with the item in the ordered set which corresponds to the index variable. In another embodiment, the invention provides a computer readable medium -containing instructions for performing the steps for determining the status of work waiting for service, and a logic circuit operable to perform the steps for determining the status of work waiting for service.

The invention also provides, in another embodiment, a computational component for performing a method, the method comprising: determining a required queue position (RQP) for each of a plurality of work items, the RQP based on a remaining time for the work item and a weighted advance time for the work queue incrementing a counter in an element of an array of counters, the element corresponding to a predefined range of required queue positions; and analyzing the array of counters to predict a future state of the work items. The determining a required queue position step may include, for each work item, subtracting an amount of time since the work item was received from a service time goal for the work item to obtain a remaining time for the work item. The determining a required queue position step may include determining the weighted advance time for the work queue and for each work item, dividing the remaining time by the weighted advance time for the work queue. The incrementing a counter step may include determining a range of required queue positions which correspond to each element within the array of counters, and incrementing a counter associated with the element within the array of counters which corresponds to the required queue position obtained in the determining a required queue position step. In one embodiment, the predefined range of queue positions for each element in the array of counters is one. In another embodiment, the predefined range of queue positions for each element in the array of counters, where the number of the element is N, is $2^{N-1}<RQP\leqq 2^N$.

In one embodiment, the analyzing step includes the steps of: creating an index variable; setting the index variable to one; creating a sum variable; setting the sum variable to zero; calculating a new sum as the sum of the value of the sum variable and the value of the counter in the element of the array of counters which corresponds to the index variable; determining if the sum is greater than the index; setting a state to "Future Risk" when the sum is greater than the index; and incrementing the index and repeating the calculating a new sum, determining if the sum is greater than the index, and setting a state when the sum is not greater than the index. In one embodiment, the determining step includes determining if the sum is greater than the highest number queue position which is associated with the element of the array of counters which corresponds to the index variable. The analyzing step may also include: determining if there are additional elements in the array of counters; and setting a state to "On Target" when there are no additional elements in the array of counters. The analyzing step may also include, when the sum is greater than the index, determining a time of the "Future Risk". The time of the future risk is calculated as the product of the index and the weighted advance time of the work queue. The analyzing step may further include, when the sum is greater than the index, determining an extent of the "Future Risk". The extent may be calculated as the difference between the sum and the index. In another embodiment, the analyzing step further includes, when the sum is greater than the highest number queue position associated with the element of the array of counters which corresponds to the index variable, determining an extent of the "Future Risk," calculated as the difference between the sum and highest number queue position associated with the element.

Another aspect of the invention provides a table maintained in an electronic memory of a contact center, comprising an identity of at least two work items, and an ordered list having entries associated with a predefined range of required queue positions for the work items. The entries, in one embodiment, indicate required queue positions for the work items. The predefined range of required queue positions for each entry in the ordered list, in one embodiment is one. In another embodiment, the predefined range of required queue positions for each entry in the ordered list, where the number of the entry is N, is $2^{N-1}<RQP\leqq 2^N$.

Another aspect of the invention provides a contact center for servicing a plurality of contacts received from a plurality of customers, comprising: a plurality of workstations corresponding to a plurality of resources; a central server in communication with the plurality of workstations, comprising at least one queue of contacts, each of the contacts having an associated service time goal, and a workload monitoring agent operable to (a) monitor the queue of contacts; (b) assess a state of the queue of contacts with respect to the service time goals for the plurality of contacts; and (c) determine a number of contacts which are likely to not meet their service time goals and a time at which the service time goal for the number of contacts will expire. In one embodiment, the contacts in the queue comprise one or more of real time and non-real time contacts. In another embodiment, the workload monitoring agent is further operable to identify a weighted advance time of the work queue and determine a required queue position for each of the contacts The workload monitoring agent may determine the required queue position based on the weighted advance time of the work queue, an elapsed time since the contact was received at the queue, and a service time goal for the contact. The required queue position is calculated, in an embodiment, as the difference between the service time goal and the elapsed time divided by the weighted advance time of the work queue. The contacts within the plurality of contacts may have at least two service time goals. The workload monitoring agent is further operable to determine, in an embodiment, a representation of required queue positions associated with the contacts in the queue. In one embodiment, a predetermined workload level exists when a queue position in the representation of required queue positions is less than a number of enqueued contacts ahead of the queue position in the representation of required queue positions. The time which the predetermined workload level will likely exist is the product of the weighted advance time of the work queue and queue position at which the predetermined workload level will likely exist. The number of contacts required to be serviced is the difference between the required queue position and the number of enqueued contacts before the required queue position.

These and other advantages will be apparent from the disclosure of the invention contained herein, particularly when taken in conjunction with the attached drawings.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
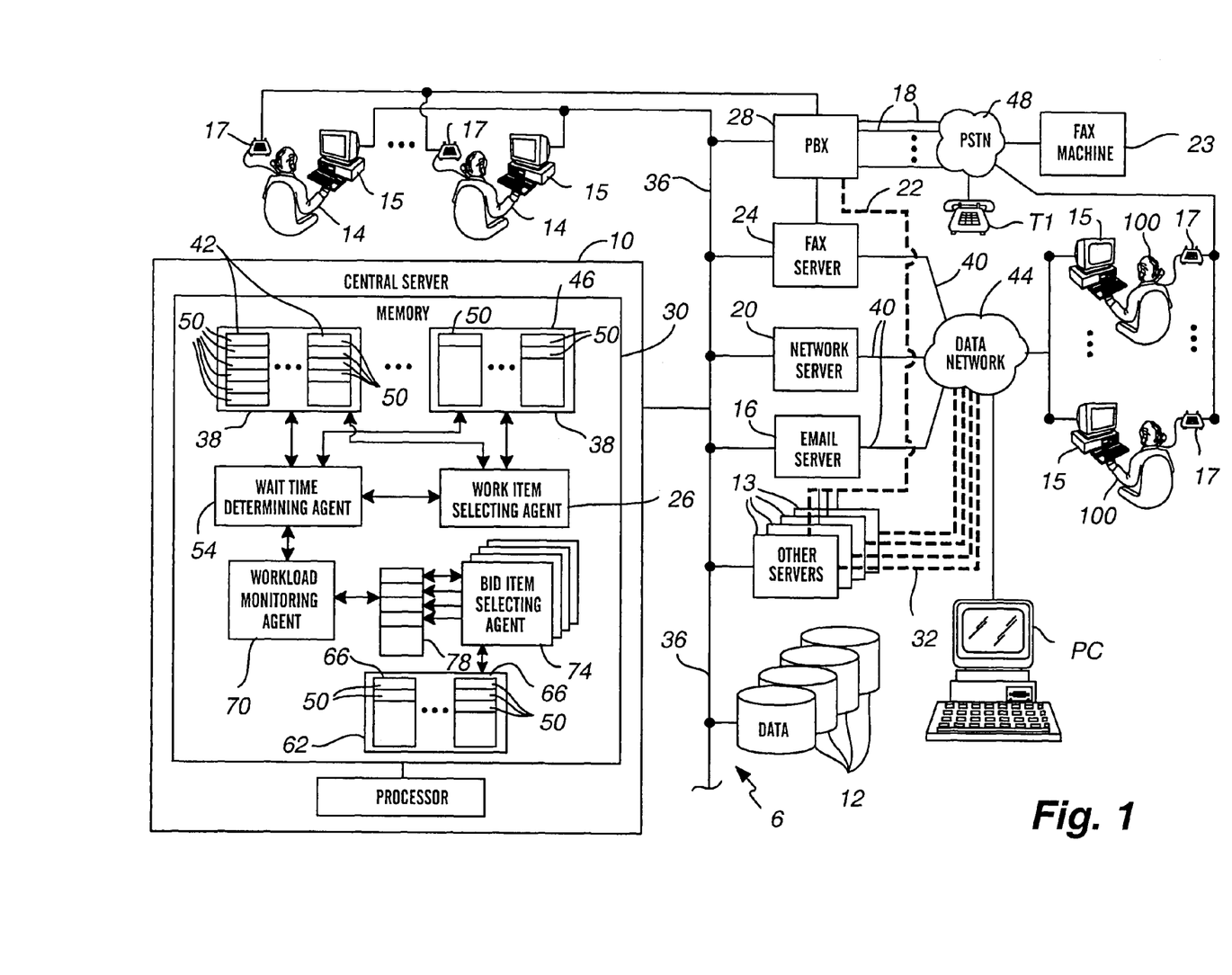
FIG. 1 is a block diagram of a contact center of one embodiment of the present invention.

FIG. 1 shows an illustrative embodiment of the present invention.

A contact center 6 comprises a central server 10 (such as a Definity™ or Multi-Vantage™ Enterprise Communications Server running modified Advocate™ software of Avaya, Inc.), a set of data stores or databases 12 containing contact or customer related information and other information that can enhance the value and efficiency of the contact, a plurality of servers, namely a fax server 24, a data network server 20, an email server 16, and other servers 13, a private branch exchange PBX 28 (or private automatic exchange PAX), a first plurality or set of resources 14 (which are shown as being human agents) operating computer work stations 15, such as personal computers, and/or telephones 17 or other type of voice communications equipment, all interconnected by a local area network LAN (or wide area network WAN) 36, and a second plurality or set of resources 100 (which are shown as being human agents) also operating computer work stations 15, such as personal computers and/or telephones 17 or other types of voice communications equipment, connected to the PBX 28 via a public switched telephone network or PSTN 48 and to the central server 10 via a data network 44, such as the Internet. The fax server 24, web server 20 and email server 16 are connected via communication connections 40 to the data network 44.

The other servers 13 can be connected via optional (dashed) communication lines 22, 32 to the PBX 28 and/or the data network 44. As will appreciated, other servers 13 could include a scanner (which is normally not connected to the PBX 28 or network 44), interactive voice recognition UVR software, VoIP software, video call software, voice messaging software, an IP voice server, and the like. The PBX 28 is connected via a plurality of trunks 18 to the PSTN 48 and to the fax server 24 and telephones 17 of the resources 14. As will be appreciated, faxes can be received via the PSTN 48 or via the network 44 by means of a suitably equipped personal computer. The PBX 28, fax server 24, email server 16, web server 20, and database 12 are conventional.

As will be appreciated, the central server 10 is notified via LAN 36 of an incoming realtime or non-realtime contact by the telecommunications component (e.g., PBX 28, fax server 24, email server 16, web server 20, and/or other server 13) receiving the incoming contact. The incoming contact is held by the receiving telecommunications component until the central server 10 forwards instructions to the component to forward the contact to a specific workstation and/or resource. The server 10 distributes and connects these contacts to workstations of available resources based on a set of predetermined criteria. The resources process the contacts sent to them by command of the central server 10.

In the architecture of FIG. 1 when the central server 10 forwards a realtime contact such as a telephone call to a resource, the central server 10 also forwards information from databases 12 to the resource's computer work station for viewing (such as by a pop-up display) to permit the resource to better serve the customer. The information is typically effected by the establishment of a data communications link between the central server and the target resource's workstation.

In one configuration, the first and second pluralities or sets of resources correspond, respectively, to employees and non-employees of the business or enterprise operating the contact center. For example, the second plurality or set of resources can be contractors, subcontractors, employees of another organization (including a bidding house), and the like. The first plurality of resources are served directly or supported by the central server/PBX and commonly service contacts to the center. In other words, the first plurality of resources or set of resources/workstations are subscribers to the enterprise network defined by the contact center 6 or are within the premises serviced by the server/PBX. The second plurality or set of resources/workstations are generally not served and/or supported directly by the central server and are typically geographically dislocated from the first plurality or set of resources. In other words, the second plurality of resources or set of workstations/resources are not subscribers to or supported by the enterprise network and are external to the premises serviced by the PBX and central server. The second set of resources may thus be "external" in that they are not directly supported as terminal endpoints by the server PBX (e.g., they do not have an extension associated with an internal endpoint serviced by the switch/server). Communications with these resources are directed through the PSTN 48 (for telephone calls) (and are received at an external port of the switch/server) and through the data network 44 (for data communications such as customer-related information transmission). The second set of resources may be used to augment or support the first set of resources, such as by servicing less valuable or profitable work items through, for example, a bidding type process discussed in copending U.S. Patent Application "Contact Center Resource Allocation Based On Work Bidding/Auction", filed on even date herewith, to Flockhart et al., which is incorporated herein by this reference.

The central server 10 includes a memory 30 having a plurality of first sets 38 of contact queues 42 and 46 corresponding to the first plurality of resources. Each set of contact queues conventionally serves and holds contacts (or work items) for a different work type and/or for realtime versus non-realtime contacts. In the depicted embodiment, queues 42 serve non-real-time contacts while queues 46 serve realtime contacts. This embodiment is particularly suited for a Customer Relationship Management (CRM) environment in which customers are permitted to use any media to contact a business. In a CRM environment, both realtime and non-realtime contacts must be handled and distributed with equal efficiency and effectiveness. Within each set of queues, each queue holds contacts of a different priority and/or different type (e.g., e-mail, fax, electronic or paper documents, web-form submissions, voice messages, voice calls, VoIP calls, text chat, video calls, and the like). The priority of a contact is determined according to well known predefined criteria. Each queue may function as a first-in, first-out (FIFO) buffer memory, and include a plurality of items, or positions 50, each for identifying a corresponding one enqueued contact. The position at the head of the queue is considered to be position 1, the next subsequent position to be position number 2, and so forth. The queues may also be unordered work queues, in which the work items contained in the queues are not in a FIFO memory. Such an unordered configuration may be beneficial, for example, for a non-real-time queue having work items with differing service time goals where re-ordering the work queue following the completion of each work item would take a significant amount of resources.

Memory 30 further includes a wait time determining agent 54. As its name implies, this agent determines an estimate of how long a contact that is placed in a queue will have to wait before being delivered to a resource for servicing and/or has already waited for servicing. The estimate may be derived separately by the agent 54 for each work item in each queue of each set, and is referred to herein as an estimated wait time (EWT).

For realtime contacts, the EWT is based on any suitable algorithm, such as the average rate of advance of contacts through positions 50 of the contacts' corresponding queue referred to herein as a weighted advance time (WAT). This estimate is derived separately by the agent 54 for each queue. An illustrative implementation of the agent 54 for real-time contacts is disclosed by U.S. Pat. No. 5,506,898, which is incorporated herein by this reference.

For non-realtime contacts, the EWT estimate is generally determined differently than for realtime contacts. One approach for calculating the wait time is set forth in U.S. patent application Ser. No. 09/641,403, filed Aug. 17, 2000, entitled "Wait Time Prediction Arrangement for Non-Real-Time Customer Contacts", which is incorporated herein by this reference.

Memory 30 can further include a work item selecting agent 26. Agent 26 is conventional. It selects a work item from one or more of the queues to be serviced by an available resource based on wait time and/or business/service policies, objectives, and goals for each contact type.

The memory further includes a workload monitoring agent 70, as will be discussed below, for predicting potential deficiencies or surpluses for the first set of resources. A bid item selecting resource 74, as discussed in copending U.S. Patent Application "Contact Center Resource Allocation Based On Work Biddine/Auction", filed on even date herewith, to Flockhart et al., may be used if a deficiency in the first set of resources is predicted, for configuring and tracking a bidding process for each work item and selecting the winning bidder for such work items.

The workload monitoring agent 70 receives EWT information from the wait time determining agent 54, monitors the length of each queue, the numbers of available resources in the plurality of first resources, the types and priorities of contacts in each monitored queue, and anticipated workload levels. Based on this information, the workload monitoring agent 70 predicts when the contact center must take action in order to meet predetermined business/service policies, objectives, and goals for each contact type.

Figure 2:
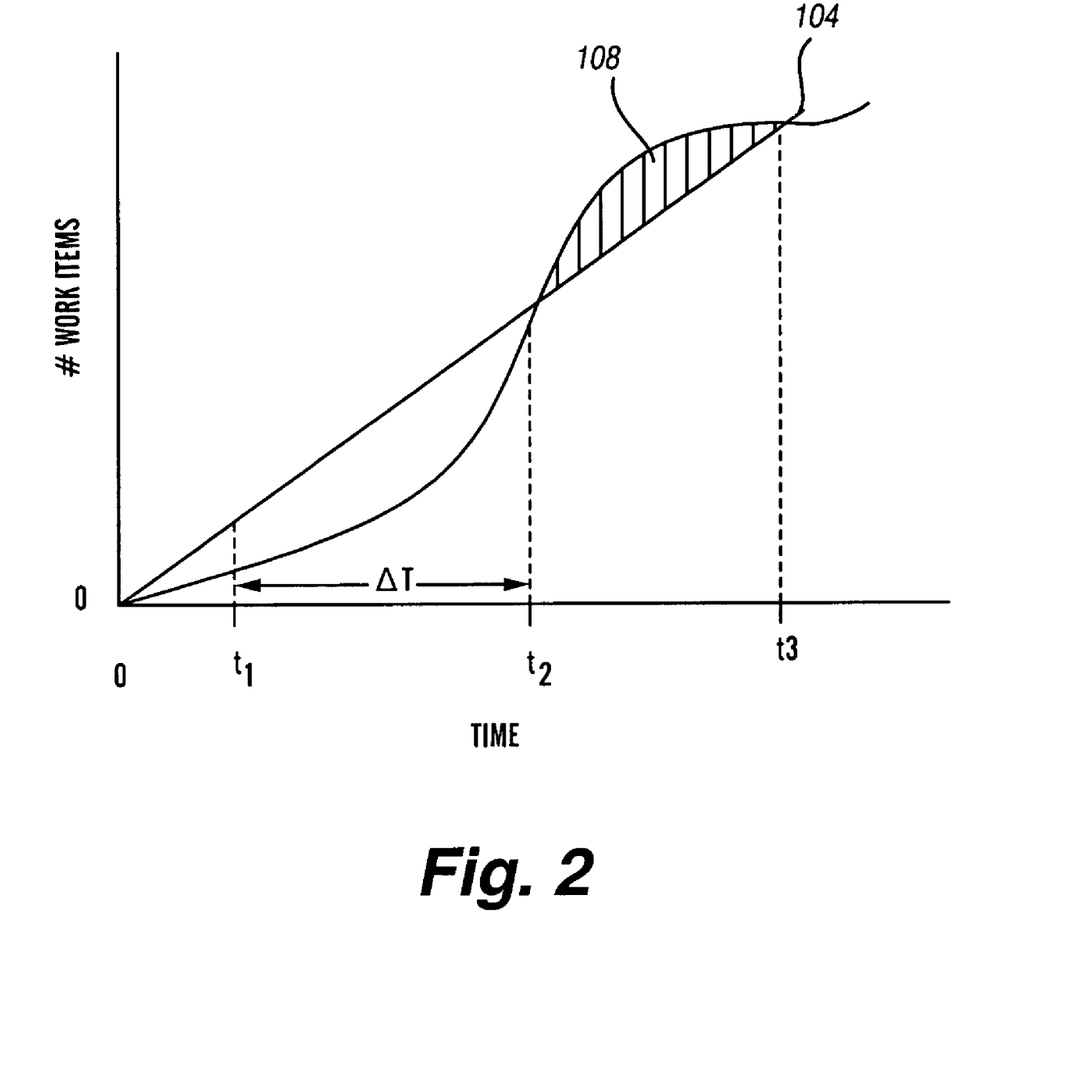
FIG. 2 is a plot of work item volume (vertical axis) versus time (horizontal axis)

A graphical illustration of prediction of the amount of work items completed as a function of time is contained in FIG. 2. As illustrated in FIG. 2, the rate at which work items can be handled as a function of time is represented by line 104. The sinusoidal waveform 108 represents the number of work items that must be serviced by the resources as a function of time. In the example illustrated in FIG. 2, there is a surplus of available resources earlier than time $t_2$, and a surplus of work items after time $t_2$. If the workload monitoring agent 70 predicts a surplus work item condition at time $t_1$, actions may be taken that are associated with excess resources, such as making number of surplus resources available for other uses. If the workload monitoring agent 70 predicts a surplus of work items, actions associated with a deficiency in resources may be taken such as a bidding process in which the surplus work items are assigned to one or more of the members of the second set of resources no later than time $t_2$.

Figure 3:
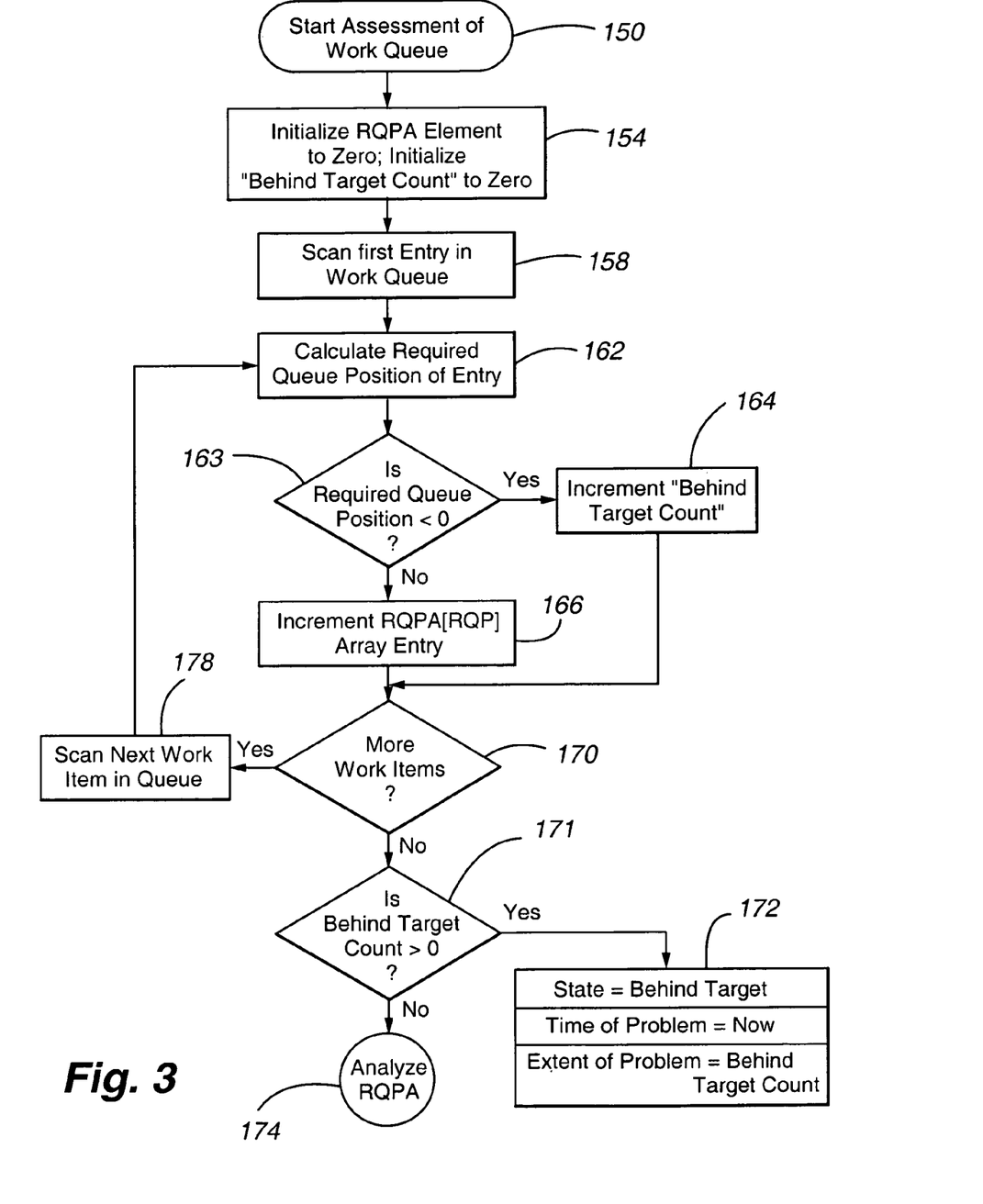
FIG. 3 is flow chart diagram illustrating the operational steps for calculating required queue positions for work items of one embodiment of the present invention.
Figure 4:
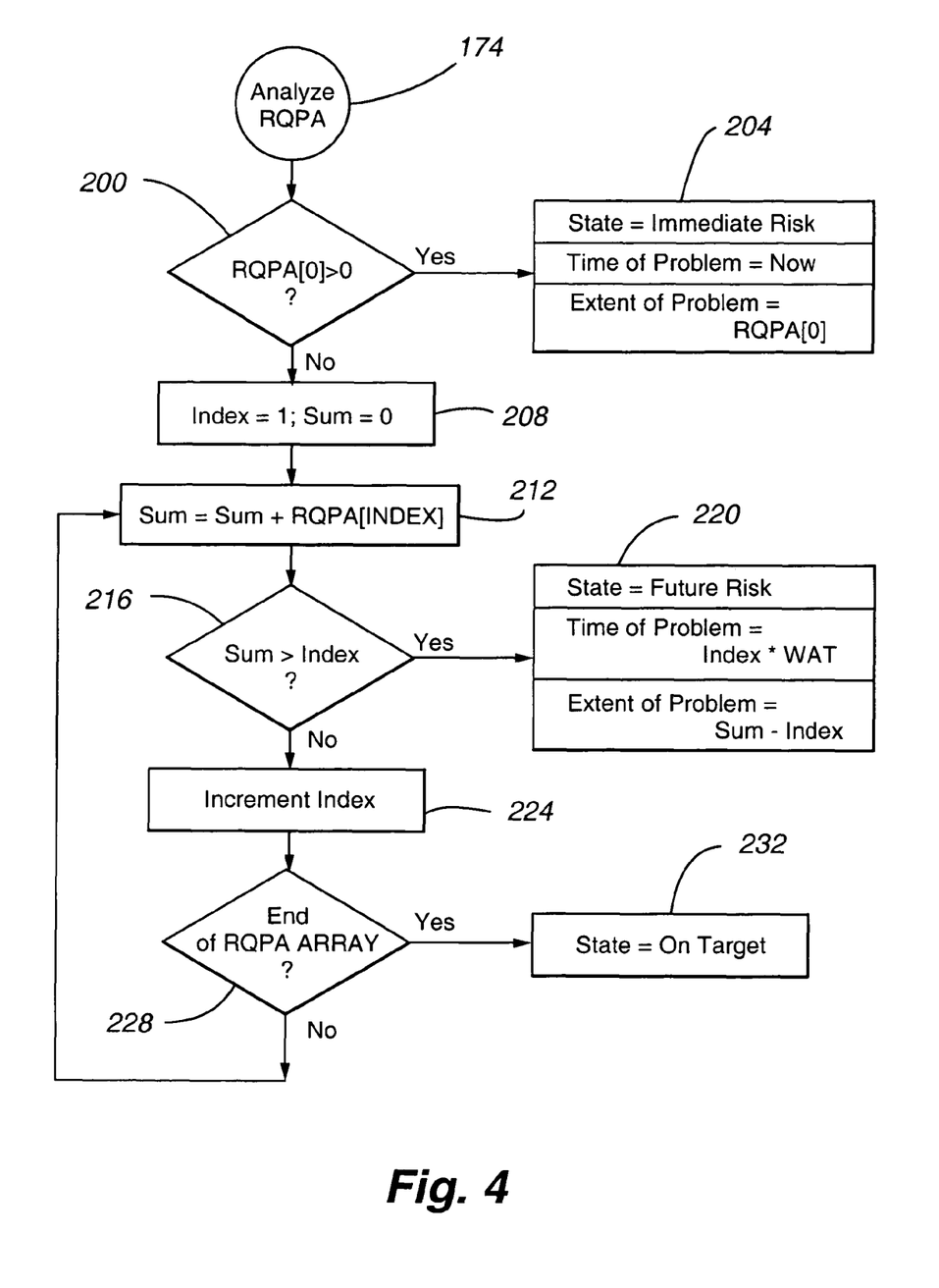
FIG. 4 is a flow chart diagram illustrating the operational steps for analyzing an array of counters of one embodiment of the present invention.

With reference now to FIGS. 3-4, the operation of the workload monitoring agent 70 of one embodiment of the present invention is described in more detail. As discussed above, work queues 42, 46 contain work items which are to be serviced by a particular pool of resources. As mentioned, in the embodiment of FIG. 1, work queues 42 are associated with non-real-time contacts and may include more than one type of contact, with each contact having a differing service time goal. Non-real time contacts may be "back office" type contacts which include contacts of several different types. For example, items in work queues 42 may include email enquiries, web forms, and purchase requests, among other things. Email enquiries may have a service time goal of one hour, web forms may have a service time goal of four hours, and purchase requests may have a service time goal of one day. These contacts, in one embodiment, are placed in work queues 42 in the order in which they were received. Accordingly, the first item in a queue may not be the item which has the shortest amount of time before the expiration of the service time goal. Such a situation may arise when the first item on a queue is a purchase request (having a service goal of one day), and the second item on the queue is an email enquiry (having a service goal of one hour). In one embodiment, the workload monitoring agent 70 assesses each of the work queues 42, 46, and assigns a state to each of the work queues 42, 46 to indicate if the queue is "behind target," "on target," has an "immediate risk," or has a "future risk." Furthermore, if the queue is in the behind target, immediate risk, or future risk states, the workload monitoring agent 70 is operable to make a prediction as to the amount of resources required to solve the problem. If a future risk state is predicted, the workload monitoring agent 70 is also operable to make a prediction of when the system will enter the risk state.

When determining the state of the work queues 42, 46, the workload monitoring agent 70, on an event basis and/or on a periodic basis, will examine a work queue or pool to determine the current state of the work items relative to their individual service time goals. Each work item in the queue or pool will have a service time goal, as described above. The remaining time for each work item in the queue or pool may be calculated as:

Remaining time=(Service Time Goal)−(Current Time).

If any work item has a negative remaining time, then the state of the work item and the work queue is "behind target." In such a situation, in one embodiment, the workload monitoring agent 70 generates an appropriate message to indicate the behind target state. The message may be sent to appropriate personnel or software system that may then take actions to remedy the problem. The message may include electronic notifications to appropriate personnel, display on a user interface, or other indication. The workload monitoring agent 70, in one embodiment, then proceeds to calculate required queue positions for each of the work items in the work queue. In another embodiment, if a behind target state is detected, the workload monitoring agent 70 simply generates the appropriate alert and does not proceed to calculate required queue positions.

When determining the required queue position, WAT for the queue is determined. As mentioned above, the WAT is the average elapsed time between each service event from the queue. For example, if work items are serviced from the queue at an average rate of one every six seconds, the WAT for that queue is six seconds, meaning that, for example, the second item in the queue would be predicted to be completed in 12 seconds. Once the WAT is determined, the required queue position for each work item in the queue or pool is then calculated as the remaining time for the work item divided by the WAT, and rounded down to the next integer number. For example, if a work item has 20 seconds remaining before its service time goal expires, and the WAT for the queue or pool is six seconds, the prediction is that the work item must be serviced by one of the next three agents to become available to service work from this queue in order to meet the service time goal. Thus, the required queue position for the work item is three.

Referring now to FIG. 3, a flow chart diagram illustrating the operational steps for calculating required queue positions for each of the work items in the queue is now described. An ordered list associated with the work items in the work queue or pool is created, which in one embodiment is an array of counters referred to as the Required Queue Position Array ("RQPA"). Each element in the RQPA indicates the number of work items which are required to be completed during the required queue position. The required queue position is indicated by the position of the element in the RQPA. Thus, the second element in the RQPA indicates the number of work items with a required queue position of two. A counter, independent of the RQPA, referred to as the "Behind Target Count," is also associated with the work queue or pool, and indicates the number of work items which are behind target. The assessment of the work queue is initiated, as indicated at block 150. Each element of the RQPA is initialized to zero, and the Behind Target Count is initialized to zero, as indicated by block 154. This is accomplished by setting each element in the RQPA, and the Behind Target Count, to have a value of zero. At block 158, the first item in the work queue is scanned. The required queue position ("RQP") is calculated for the work item, as noted by block 162. Following the calculation of the required queue position for the work item, it is determined whether the required queue position is less than zero, as noted by block 163. A negative required queue position indicates that the remaining time is negative, and the work item is behind target. If the required queue position is negative, the Behind Target Count is incremented, according to block 164. If the required queue position is zero or greater, the element in the RQPA array corresponding to the required queue position, RQPA[RQP], is incremented, according to block 166. At block 170, it is then determined if there are more work items in the work queue. If there are no more work items, it is determined if the Behind Target Count is greater than zero at block 171. If the Behind Target Count is not greater than zero, the RQPA is analyzed, as noted by block 174. If the Behind Target Count is greater than zero, the workload monitoring agent sets the current state to be "behind target," indicating that the time of the problem is the current time, and that the extent of the problem is the Behind Target Count, according to block 172. If there are more work items in the work queue, the next work item in the work queue is scanned, according to block 178. Following the scan of the next work item, the operational steps described with respect to blocks 162 through 178 are repeated. Thus, following the assessment of the work queue, the RQPA is created which includes items in each array element corresponding to the number of work items that must be completed by the time corresponding to the queue position of the RQPA.

Referring now to FIG. 4, the operational steps for analyzing the RQPA are described for one embodiment of the present invention. Initially, as noted by block 200, it is determined if element zero of the required queue position array (RPQA[0]) is greater than zero. This indicates that one or more work items has a required queue position of zero, which indicates that the work item should have been serviced by the previous agent to become available. By the time the next agent becomes available that can process the work item, it is likely that the work item will already have missed its service time objective. In such a case, the workload monitoring agent sets the current state to be "immediate risk," indicating that the time of the problem is the current time, and that the extent of the problem is the value of RQPA[0], as indicated by block 204. If it is determined that RQPA[0] is zero, the workload monitoring agent 70, at block 208, sets an index variable to one, and a sum variable to zero. The workload monitoring agent 70 then sets the sum variable to be the total of the sum, plus the value of the required queue position array element corresponding to the index variable (Sum=Sum+RQPA[Index]), as noted by block 212. At block 216, it is then determined if the sum is greater than the index. If the sum is greater than the index, this indicates that the total number of work items which need to be completed is greater than the total number of work items that are predicted to be completed at the current rate of service work items as measured by the WAT.

If the sum is greater than the index, the state of the system is set to "Future Risk," the predicted time of the problem is the product of the index and the WAT (Index*WAT), and the extent of the problem is the difference between the sum and index (sum-Index). If the sum is not greater than the index at block 216, the index is incremented, according to block 224. The determination is made at block 228 if the end of the RQPA has been reached. If the end of the RQPA has been reached, the state of the system is "On Target," meaning that there are no predicted shortfalls in resources for the work items that are in the work queue or work pool. If at block 228, it is determined that the end of the RQPA has not been reached, the operational steps of blocks 212 through 228 are repeated until either the end of the RQPA is reached, or until a state of "Future Risk" is found. For example, if the index is at six, and the sum of the work items with required queue positions of six or less is nine (Index=6, Sum=9), this indicates that three work items are predicted to not be completed by their service time goal. If the WAT is 15 seconds, the time that this problem will occur is predicted to be 90 seconds (Index*WAT=6*15=90 seconds). The extent of the problem is predicted to be three work items. This information, in one embodiment is displayed on a user interface, and an electronic notification is forwarded to appropriate personnel or software systems that may then attempt to correct the problem before it occurs. While the embodiment of FIG. 4 stops when evidence of a problem is detected, in another embodiment the entire array is scanned, even if a "Future Risk" state is found, in order to find all potential problems and/or the most severe problem.

Furthermore, in one embodiment, the workload monitoring agent 70 monitors the work queues for instances in which surplus resources are predicted. For example, if the state of the system is "on target," the workload monitoring agent 70 may determine how many surplus resources are available. Such surplus resources may be allocated to different functions, for example. When determining the number of surplus resources, and the time of the surplus, similar calculations as described above may be utilized. The difference between the sum and the highest number queue position associated with an element in the RQPA may be utilized to indicate how many surplus resources are predicted for the time associated with the queue position. For example, if the sum is 20 and the highest queue position associated with the RQPA element is 30, this indicates that ten surplus resources are predicted to be available at that point in time while maintaining service time goals for work items in the work queue. If the state of the system is "on target," this indicates that these surplus resources may be used for other tasks while maintaining service time goals for all of the work items presently in the queue if removing the surplus resources would not place the state of the system to future risk.

As can be seen, the system and method provided above produces results of both a time of the potential problem, as well as the extent of the potential problem, which is beneficial in proactive solving of the potential problem. Furthermore, this system and method may be used in both ordered work queues, as well as unordered work queues or work pools. This is a result of each work item being evaluated for its required queue position, and the array of counters having elements which correspond to the required queue positions which are incremented each time a work item having that required queue position is scanned. Accordingly, even if work items are unordered, when each item is scanned, its required queue position is included in the array of counters which may then be assessed to determine the status of work queue or work pool.

It will be understood that the embodiment of FIGS. 3-4 is illustrative of one of many techniques which may be used to assess the status of work items waiting for service. Other alternatives exist for creating and analyzing an ordered list associated with work items waiting for service, and would be readily understood by one of skill in the art. For example, a required queue position array may be initialized with each element within the array having a numerical value equivalent to the position of the element within the array. Thus, position one of the array would have a value of one, position two of the array would have a value of two, and so on. When a work item is evaluated and the required queue position for the work item is determined, the value of the elements in the required queue position array associated with the required queue position and higher may then be decremented. In this manner, the elements within the required queue position array are updated to indicate a status of the work waiting for service. The RQPA may then be scanned for any negative items, which would indicate that more work items are present than are anticipated to be completed prior to the time associated with that required queue position.

Figure 5:
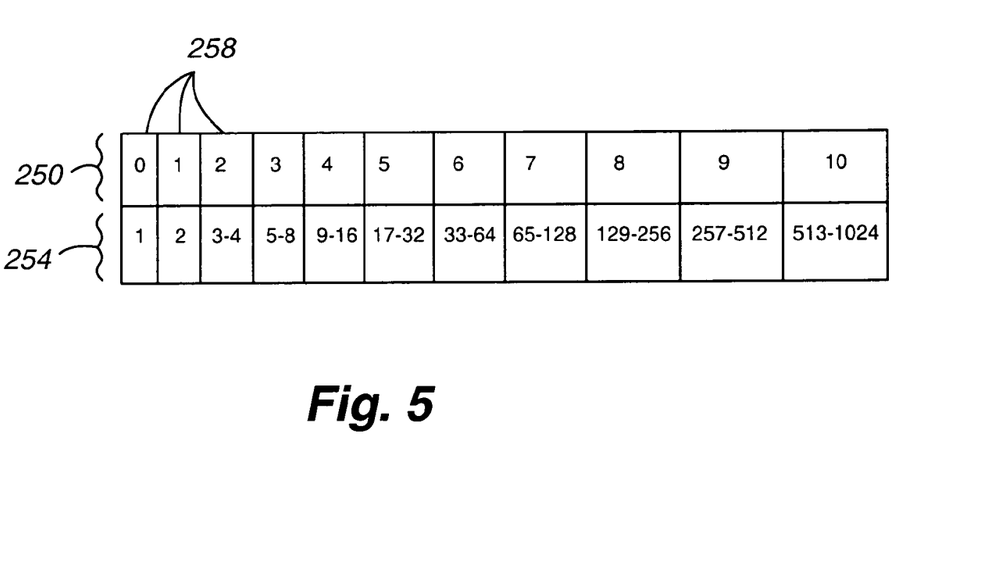
FIG. 5 is a table illustrating elements of an array of counters and ranges of required queue positions associated with each element according to one embodiment of the present invention.

In another embodiment, the array of counters does not include every required queue position as an element of the array, but rather a range of required queue positions are assigned to particular array elements. FIG. 5 is a table illustrating an array of counters 250, and corresponding queue positions 254 associated with each element 258 of the array. In this embodiment, for the elements in the array of counters, each element 258 ("N") in the array stores the number of work items having a required queue position ("RQP") in the range of: $2^{N-1} < RQP \leq 2^N$. Thus, as illustrated in the table of FIG. 5, for example, array element three would contain a count of the number or work items having a RQP in the range of five through eight, and array element four would contain the count of the number of work items having a RQP in the range of 9 through 16. When scanning work items in this embodiment, any work items which have an RQP of zero will place the system into an "immediate risk" state, and the array is then analyzed to determine any future risk states.

The analysis of the array can detect potential problems in the defined range of RQPs, rather than at every RQP. If work queues are of a significant size, this embodiment results in a performance increase due to the array being much shorter, thus consuming fewer system resources. In this embodiment, an array of counters containing ten elements can handle work queues or work pools of about 1000 work items. Additionally, this embodiment places greater focus on work items having service time goals which expire in a relatively short amount of time, where there is less time to react to any detected problems, while problems with work items having service time goals which expire in a relatively long amount of time are indicated in an approximate time range. The increased granularity of lower required queue positions allows for immediate attention to short term problems, while the decreased granularity of higher required queue positions allows for longer term planning and solutions. Thus, if a potential problem is detected in, for example, required queue positions 65-128, appropriate personnel may be alerted who then have a relatively long period of time to take corrective action compared to a situation where a potential problem is detected in required queue position 4. While the embodiment of FIG. 5 uses RQP ranges which are powers of two, any ranges of RQPs may be used for elements in such an array, as will be readily understood by one of skill in the art.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method, in a contact center comprising a central server for distributing work items to workstations of a first set of resources, and a work queue having a plurality of work items, the method comprising:
   receiving the plurality of work items at at least one telecommunications component of the contact center from a plurality of customers, wherein the at least one telecommunications component comprises at least one of a PBX and a server;
   generating, in a server executing a workload monitoring agent, based at least in part on said work queue, an ordered set of items related to the plurality of work items in the work queue;
   analyzing, by said server executing the workload monitoring agent, said ordered set, wherein the analyzing step determines a required queue position for each of the plurality of work items, wherein at least one of the following is true for a selected required queue position;
   (i) multiple of the work items have a determined required queue position equal to the selected required queue position; and
   (ii) no work items have a determined required queue position equal to the selected required queue position and wherein the selected required queue position is closer to a head of the ordered set than another selected required queue position that equals a determined required queue position of at least one of the work items;
   based on said analyzing step, determining in said server executing the workload monitoring agent a state of said work queue;
   forwarding work items in the work queue to workstations of the first set of resources; and
   when the workload monitoring agent predicts a surplus of work items, additionally forwarding work items to workstations of a second set of resources.

2. The method of claim 1, wherein the workstations of the first set of resources service the work items forwarded thereto and the workstations of the second set of resources service the work items forwarded thereto.

3. The method of claim 1, wherein if the state indicating a surplus of work items being predicted is a future risk state, the method further includes predicting when the surplus of work items will occur, and additionally forwarding work items in the work queue to workstations of the second set of resources in dependence on said prediction.

4. The method of claim 1, wherein said required queue position ("RQP") is based on a service time goal for each work item and a weighted advance time of the work queue.

5. The method of claim 4, wherein said generating step includes:
   creating an array of counters, each element in said array of counters corresponding to a predefined range of RQP's; and
   incrementing a counter in said array of counters associated with the RQP for each work item; and wherein said determining step includes:
   for each work item, subtracting from the service time goal for said work item an amount of time since said work item was received to obtain a remaining time for said work item.

6. The method of claim 4, wherein said determining step includes:
   determining said weighted advance time of the work queue; and
   for each work item, dividing a remaining time by said weighted advance time for the work queue.

7. The method of claim 4, wherein said generating step further comprises:
   determining a range of RQP's which correspond to each item within said ordered set, wherein, when a number of a selected item is N, said predefined range of queue positions for the selected item in said ordered set, is $2^{N-1} < RQP \leq 2^N$.

8. The method of claim 1, wherein said analyzing step comprises:
   creating an index variable;
   setting the index variable to one;
   creating a sum variable;
   setting said sum variable to zero;
   calculating a new sum as the sum of the previous value of the sum variable and the value of an item in the ordered set which corresponds to the index variable;
   determining a highest required queue position, RQP, associated with the item in the ordered set which corresponds to the index variable;
   determining if the sum is greater than said highest RQP;
   setting a state to "Future Risk" when said sum is greater than said highest RQP; and
   incrementing said index and repeating said calculating a new sum, determining a highest RQP, determining if the sum is greater than the highest RQP, and setting a state steps when said sum is not greater than said highest RQP.

9. The method of claim 8 wherein said analyzing step further comprises:
   determining if there are additional items in said ordered set;
   setting a state to "On Target" when there are no additional items in said ordered set; and
   when said sum is greater than said highest RQP, predicting a time and/or extent of said "Future Risk".

10. The method of claim 9 wherein said time is calculated as the product of the index and the weighted advance time for the work queue and wherein said extent is calculated as a difference between said sum and said highest RQP.

11. A computer-readable medium containing processor executable instructions for performing the method of claim 1.

12. A contact center, comprising:
    at least one work queue of a plurality of work items from a plurality of customers;
    a plurality of workstations corresponding to a first set of resources;
    a workload monitoring agent operable to:
    generate, based at least in part on said work queue, an ordered set of items related to the plurality of work items in the work queue;

analyze said ordered set, wherein the analyzing step determines a required queue position for each of the plurality of work items, wherein at least one of the following is true for a selected required queue positions;
  (i) multiple of the work items have a determined required queue position equal to the selected required queue position; and
  (ii) no work items have a determined required queue position equal to the selected required queue position and wherein the selected required queue position is closer to a head of the ordered set than another selected required queue position that equals a determined required queue position of at least one of the work items;
determine a state of said work queue based on said analysis;
cause the work items in the work queue to be forwarded to workstations of the first set of resources; and
when the state corresponds to a predicted surplus of work items, additionally cause work items to be forwarded to workstations of a second set of resources.

13. The contact center of claim 12, wherein each of said work items has an associated service time goal, said workload monitoring agent being further adapted to:
  (a) monitor said at least one queue of work items;
  (b) assess a state of said at least one queue of work items with respect to the service time goals for said plurality of work items;
  (c) determine a number of work items which are likely not to meet their service time goals and a time at which the service time goal for said number of work items will expire; and
  (d) in response to determining a number of work items are likely not to meet their service time goals, assign at least one resource from the second set of resources to at least one of said work items.

14. The contact center of claim 12, wherein the workload monitoring agent is further operable to (i) identify a weighted advance time for servicing of work items, (ii) determine a required queue position for each of said work items, (iii) determine said required queue position based on the weighted advance time for servicing of work items, an elapsed time since the work item was received at said at least one queue, and a service time goal for the work items, and (iv) determine, from the at least one queue, a representation of required queue positions associated with the work items in said at least one queue.

15. The contact center of claim 12, wherein said required queue position is calculated as a difference between the service time goal and the elapsed time divided by the weighted advance time for servicing of work items.

16. The contact center of claim 12, wherein a predetermined workload level exists when a queue position in a representation of required queue positions is less than a number of enqueued work items ahead of the queue position in the representation of required queue positions, wherein a time at which the predetermined workload level will likely exist is a product of the weighted advance time for servicing of work items and queue position at which the predetermined workload level will likely exist; and wherein a number of work items required to be serviced is a difference between the required queue position and the number of enqueued work items before the required queue position.

17. The contact center of claim 12, wherein the workstations of the first set of resources service the work items forwarded thereto and the workstations of the second set of resources service the work items forwarded thereto.

18. A method, comprising:
receiving a plurality of work items at at least one telecommunications component of a contact center from a plurality of customers, wherein the at least one telecommunications component comprises at least one of a PBX and a server;
assigning the work items to at least one work queue serviced by a first set of resources;
generating, in a server executing a workload monitoring agent, based at least in part on said work queue, an ordered set of items related to the plurality of work items in the work queue;
analyzing, by said server executing the workload monitoring agent, said ordered set, wherein the analyzing step determines a required queue position for each of the plurality of work items, wherein at least one of the following is true for a selected required queue positions;
  (i) multiple of the work items have a determined required queue position equal to the selected required queue position; and
  (ii) no work items have a determined required queue position equal to the selected required queue position and wherein the selected required queue position is closer to a head of the ordered set than another selected required queue position that equals a determined required queue position of at least one of the work items; and
based on said analyzing step, assigning the work items in the work queue to the first set of resources.

19. The method of claim 18, further comprising:
determining in said workload monitoring agent a state of said work queue; and
when the work queue state is a surplus of work items, additionally forwarding work items to a second set of resources.

20. The method of claim 18, wherein (i) is true.

21. The method of claim 18, wherein (ii) is true.

22. The method of claim 19, wherein the first set of resources service the work items forwarded thereto and the second set of resources service the work items forwarded thereto.

23. The method of claim 18, further comprising:
determining in said workload monitoring agent a state of said work queue; and
wherein if the work queue state predicts a surplus of work items and is a future risk state, the method further includes predicting when the surplus of work items will occur, and additionally forwarding work items in the work queue to a second set of resources in dependence on said prediction.

24. The method of claim 18, wherein said required queue position ("RQP") is based on a service time goal for each work item and an estimated wait time of the work queue.

25. The method of claim 24, wherein said generating step includes:
creating an array of counters, each element in said array of counters corresponding to a predefined range of RQP's; and
incrementing a counter in said array of counters associated with the RQP for each work item; and wherein said determining step includes:
for each work item, subtracting from the service time goal for said work item an amount of time since said work item was received to obtain a remaining time for said work item.

26. The method of claim 24, wherein said determining step includes:
   determining a weighted advance time of the work queue; and
   for each work item, dividing a remaining time by said weighted advance time for the work queue.

27. The method of claim 25, wherein said generating step further comprises:
   determining a range of RQP's which correspond to each item within said ordered set, wherein, when a number of a selected item is N, said predefined range of queue positions for the selected item in said ordered set, is $2^{N-1} < RQP \leq 2^N$.

28. The method of claim 18, wherein said analyzing step comprises:
   creating an index variable;
   setting the index variable to one;
   creating a sum variable;
   setting said sum variable to zero;
   calculating a new sum as the sum of the previous value of the sum variable and the value of the item in the ordered set which corresponds to the index variable;
   determining a highest required queue position, RQP, associated with the item in the ordered set which corresponds to the index variable;
   determining if the sum is greater than said highest RQP;
   setting a state to "Future Risk" when said sum is greater than said highest RQP; and
   incrementing said index and repeating said calculating a new sum, determining a highest RQP, determining if the sum is greater than the highest RQP, and setting a state steps when said sum is not greater than said highest RQP.

29. The method of claim 28, wherein said analyzing step further comprises:
   determining if there are additional items in said ordered set;
   setting a state to "On Target" when there are no additional items in said ordered set; and
   when said sum is greater than said highest RQP, predicting a time and/or extent of said "Future Risk".

30. The method of claim 29 wherein said time is calculated as the product of the index and the weighted advance time for the work queue and wherein said extent is calculated as the difference between said sum and said highest RQP.

31. A computer-readable medium containing processor executable instructions for performing the method of claim 18.

32. A contact center, comprising:
   at least one work queue of a plurality of work items from a plurality of customers;
   a first set of resources;
   a workload monitoring agent operable to:
      generate, based at least in part on said work queue, an ordered set of items related to the plurality of work items in the work queue;
      analyze said ordered set, wherein the analyzing step determines a required queue position for each of the plurality of work items, wherein at least one of the following is true for a selected required queue positions;
         (i) multiple of the work items have a determined required queue position equal to the selected required queue position; and
         (ii) no work items have a determined required queue position equal to the selected required queue position and wherein the selected required queue position is closer to a head of the work queue than another selected required queue position that equals a determined required queue position of at least one of the work items; and
      based on the required queue positions, assign the work items in the work queue to be forwarded to the first set of resources.

33. The contact center of claim 32, wherein each of said work items has an associated service time goal, said workload monitoring agent being further adapted to:
   (a) monitor said at least one queue of work items;
   (b) assess a state of said at least one queue of work items with respect to the service time goals for said plurality of work items;
   (c) determine a number of work items which are likely not to meet their service time goals and a time at which the service time goal for said number of work items will expire; and
   (d) in response to determining a number of work items are likely not to meet their service time goals, assign at least one resource from the second set of resources to at least one of said work items.

34. The contact center of claim 32, wherein the workload monitoring agent is further operable to (i) identify a weighted advance time for servicing of work items, (ii) determine a required queue position for each of said work items, (iii) determine said required queue position based on the weighted advance time for servicing of work items, an elapsed time since the work item was received at said at least one queue, and a service time goal for the work items, and (iv) determine, from the at least one queue, a representation of required queue positions associated with the work items in said at least one queue.

35. The contact center of claim 32, wherein said required queue position is calculated as the difference between the service time goal and the elapsed time divided by a weighted advance time for servicing of work items.

36. The contact center of claim 32, wherein a predetermined workload level exists when a queue position in a representation of required queue positions is less than a number of enqueued work items ahead of the queue position in the representation of required queue positions, wherein the time at which the predetermined workload level will likely exist is the product of a weighted advance time for servicing of work items and queue position at which the predetermined workload level will likely exist; and wherein the number of work items required to be serviced is the difference between the required queue position and the number of enqueued work items before the required queue position.

37. The contact center of claim 32, wherein the workload monitoring agent determines a state of said work queue based on said analysis; and wherein the first set of resources services the work items forwarded thereto and the second set of resources services the work items forwarded thereto.

38. The contact center of claim 32, wherein (i) is true.

39. The contact center of claim 32, wherein (ii) is true.

40. The contact center of claim 32, wherein each required queue position N corresponds to a range of work queue positions and wherein the work queue positions range from $2^{N-1}$ to $2^N$.

41. The contact center of claim 32, wherein each required queue position corresponds to multiple positions in the work queue.

42. The method of claim 18, wherein each required queue position N corresponds to a range of work queue positions and wherein the work queue positions range from $2^{N-1}$ to $2^N$.

43. The method of claim 18, wherein each required queue position corresponds to multiple positions in the work queue.

* * * * *